United States Patent [19]

Hehl

[11] Patent Number: 4,731,005
[45] Date of Patent: Mar. 15, 1988

[54] INJECTION MOLDING UNIT FOR AN INJECTION MOLDING MACHINE

[76] Inventor: Karl Hehl, Arthur-Hehl-Strasse 32, D-7298 Lossburg 1, Fed. Rep. of Germany

[21] Appl. No.: 876,806

[22] Filed: Jun. 20, 1986

[30] Foreign Application Priority Data

Jul. 26, 1985 [DE] Fed. Rep. of Germany ....... 3526710
Feb. 19, 1986 [DE] Fed. Rep. of Germany ....... 3605219

[51] Int. Cl.⁴ ............................................. B29C 45/07
[52] U.S. Cl. .................. 425/185; 425/192 R; 425/542; 425/567; 425/574
[58] Field of Search ............... 425/192 R, 542, 567, 425/569, 573, 574, 185, 190, 182, 186

[56] References Cited

U.S. PATENT DOCUMENTS

| | | | |
|---|---|---|---|
| 3,510,915 | 5/1970 | Johansson | 425/192 X |
| 3,564,658 | 2/1971 | Hehl | 425/192 X |
| 3,761,198 | 9/1973 | Hehl | 425/192 |
| 3,761,214 | 9/1973 | Hehl | 425/192 |
| 3,788,788 | 1/1974 | Hehl | 425/192 |
| 3,852,010 | 12/1974 | Hehl | 425/192 |
| 3,980,208 | 9/1976 | Hehl | 432/58 |
| 4,195,934 | 4/1980 | Spanier | 425/192 X |
| 4,473,346 | 9/1984 | Hehl | 425/192 R X |

FOREIGN PATENT DOCUMENTS

| | | | |
|---|---|---|---|
| 69221 | 5/1982 | European Pat. Off. . | |
| 904463 | 2/1954 | Fed. Rep. of Germany . | |
| 1949620 | 4/1971 | Fed. Rep. of Germany | 425/542 |
| 3229223 | 4/1983 | Fed. Rep. of Germany . | |
| 3228161 | 1/1984 | Fed. Rep. of Germany . | |
| 3337546 | 4/1985 | Fed. Rep. of Germany . | |
| 3447597 | 8/1986 | Fed. Rep. of Germany | 425/542 |
| 2040212 | 8/1980 | United Kingdom | 425/542 |

Primary Examiner—Richard L. Chiesa
Attorney, Agent, or Firm—Spencer & Frank

[57] ABSTRACT

An injection molding machine includes an injection molding unit which has a plasticizing unit formed of a plasticizing cylinder and a feed screw rotatably and axially shiftably received in the plsticizing cylinder, a supply block having a central passage adapted to receive an end portion of the plasticizing cylinder and a hopper or chute communicating with the passage. The machine has a material changing device which includes a carriage arranged at the injection molding unit for displacement along a travel path with respect to the chute or hopper of the plasticizing unit; a plurality of spaced drop holes arranged on the carriage in a series extending generally parallel to the travel path and being adapted to be individully brought into alignment in a material charging position with the chute dependent on locations of the carriage; a plurality of conduits, each being coupled to a separate drop hole, for admitting plastic material to the chute from a location externally of the injection molding unit; a plurality of gates mounted on the carriage for travel therewith; each gate cooperates with a separate drop hole and each gate has an open position in which plastic material may pass through the respective drop hole from the conduit connected thereto and each gate has a closed position in which passage of the plastic material through the respective drop hole is blocked; a gate control device mounted stationarily with respect to the chute for moving a single selected gate, associated with the drop hole dwelling in the material charging position, into the open or closed position; and a coupling device for connecting the single selected gate to and disconnecting it from the gate control device.

15 Claims, 12 Drawing Figures

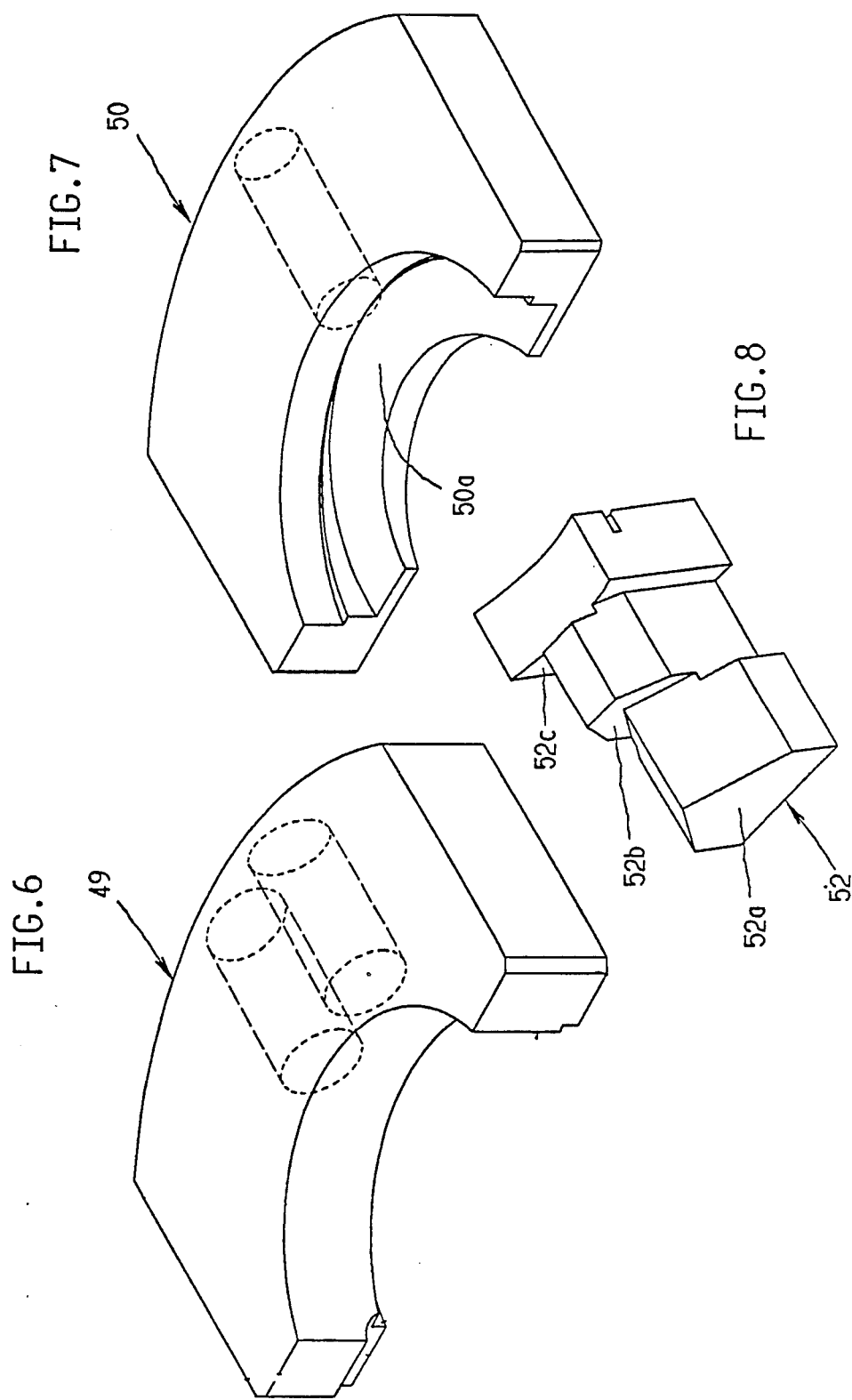

INJECTION MOLDING UNIT FOR AN INJECTION MOLDING MACHINE

BACKGROUND OF THE INVENTION

This invention relates to an injection molding unit forming part of an injection molding machine for synthetic materials and is of the type which includes a plasticizing unit replaceable by program control. The plasticizing unit includes a plasticizing cylinder which receives a rotatable and axially shiftable feed screw, a supply block which has a central passage for receiving the plasticizing cylinder and through which the synthetic material is delivered to the plasticizing cylinder by means of a supply conduit from a reservoir situated externally of the injection molding unit. The supply conduit is connectable to a hopper provided in the supply block. The injection molding unit is further equipped with at least one hydraulic drive cylinder for inserting the injection molding unit in the injection mold assembly and a hydraulic injection cylinder for causing the feed screw to perform its injection stroke by virtue of an axial shift within the plasticizing cylinder. Further, there are provided radially guided bolts for a releasable locking of the plasticizing unit with the other components of the injection molding unit with the intermediary of the supply block.

A known injection molding unit of the above-outlined type is disclosed in published European Patent Application No. 69,221 and German Offenlegungsschrift (non-examined published application) No. 3,229,223. In the structure disclosed therein the plasticizing cylinder and the supply block are unreleasably attached to one another and form a relatively bulky and heavy structural unit. The latter is, as a plasticizing unit in a broad sense, releasably lockable to the other components of the injection molding unit as a precondition for its replaceability. For effecting locking, the supply block may be axially tightened to the housing of the other components of the injection molding unit with the aid of clamping bolts which have obliquely oriented faces and which are guided for radial movement in the housing. Consequently, for replacing the plasticizing unit, in each instance it is necessary to disassemble from the supply block the supply device which advances the plastic material to be processed by the plasticizing unit. Such a work could be included only with a very significant technical input in the program of a computer associated with the injection molding machine.

In contradistinction, in an apparatus disclosed in German Patent No. 3,228,161 the type, number and sequence of materials may be included in the program of the computer for selectively charging the hopper or chute of the supply block with different types of material. The plastic material changing device includes a rail secured to the supply block and oriented horizontally and transversely to the injection axis and extending on both sides of the hopper. The device further has a motor-driven sled mounted on the rail and reservoirs which are secured to the sled and which accommodate the various plastic materials. The reservoirs may be displaced with the sled on the rail in such a manner according to the program that the outlet opening of the supply container accommodating the momentarily desired plastic material is aligned with the hopper of the supply block and between the outlet opening of the reservoir and the hopper an open connection exists by virtue of a drop hole of the rail. It is a disadvantage of this arrangement that during the setting of the injection molding unit onto and its removal from the injection mold assembly, at the reservoirs significant tilting torques appear which expose the sled, its guide components, as well as the runner rail to significant loads.

As disclosed in German Offenlegungsschrift No. 3,337,546 and German Patent No. 904,463, it is also known to integrate in the injection molding machine two or more injection molding units which are selectively placed into the working position to process different plastic materials with different plasticizing units with only short down periods. To provide for the alternating use of plastic materials and plasticizing units by means of entire injection molding units in a standby state is inherently very complex and expensive.

SUMMARY OF THE INVENTION

It is an object of the invention to provide an improved injection molding unit of the above-outlined type in which down periods are very short during the replacement of the plasticizing unit, and for the simultaneously required change of the plastic material to be processed, several plastic materials are alternately available for use according to a program without the need to move the supply devices for the materials from the supply block prior to removing the plasticizing unit from the other components of the injection molding unit, or when—in case of small injection molding units where the plasticizing unit forms a permanently attached part of the injection molding unit—the entire injection molding unit is replaced.

These objects and others to become apparent as the specification progresses, are accomplished by the invention, according to which, briefly stated, the injection molding machine has a material changing device which includes a carriage arranged at the injection molding unit for displacement along a travel path with respect to the chute or hopper of the plasticizing unit; a plurality of spaced drop holes arranged on the carriage in a series extending generally parallel to the travel path and being adapted to be individually brought into alignment in a material charging position with the chute dependent on locations of the carriage; a plurality of conduits, each being coupled to a separate drop hole, for admitting plastic material to the chute from a location externally of the injection molding unit; a plurality of gates mounted on the carriage for travel therewith; each gate cooperates with a separate drop hole and each gate has an open position in which plastic material may pass through the respective drop hole from the conduit connected thereto and each gate has a closed position in which passage of the plastic material through the respective drop hole is blocked; a gate control ddvice mounted stationarily with respect to the chute for moving a single selected gate, associated with the drop hole dwelling in the material charging position, into the open or closed position; and a coupling device for connecting the single selected gate to and disconnecting it from the gate control device.

The invention as outlined above has the additional advantage that a greater number of materials may be held in a standby condition than in the known material changing devices, because the distance between the supply conduits may be significantly smaller than between the reservoirs of the known changing apparatus and because, in addition, the heretofore required "emptying position" of the changing device may be dispensed with. No measures are necessary for removing (separating) the plastic material supply devices. Further, a supply conduit for a plastic material which serves exclusively as a cleaner may be easily attached. Such a plastic material has a relatively high melting point which should be higher than that of the previously used plastic material intended to be cleaned out of the plasticizing unit. The plasticizing unit to be cleaned is blown empty by the material serving as the cleaner.

In injection molding plants, as a rule, all manufacturing jobs may be done with a plastic material which belongs to a group of materials of limited number. All such materials are, as a rule, available through the material changing device exclusively according to a computer program without adversely affecting the motion characteristics of the injection molding unit by excessive loads. Since upon exchanging the plasticizing unit, the supply block remains in principle with the other components of the injection molding unit, the supply block may be dimensioned sufficiently large in order to radially guide locking bolts therein for engagement into the bare plasticizing cylinder and thus to hold the plasticizing cylinder firmly and reliably in the operating position by locking and axial biasing (clamping).

According to a further feature of the invention, the plasticizing cylinder is biased in the direction in which it is axially stressed by the rhythmic injection strokes of the plasticizing unit. This arrangement ensures that the injection strokes do not adversely affect the holding mechanism for the plasticizing cylinder but, on the contrary, provide an improvement therefor.

BRIEF DESCRIPTION OF THE DRAWING

FIG. 6 is a perspective view of a slidable locking bolt incorporated in the preferred embodiment.

FIG. 7 is a perspective view of a slidable clamping bolt incorporated in the preferred embodiment.

FIG. 8 is a perspective view of an unlocking member forming part of the preferred embodiment.

DESCRIPTION OF THE PREFERRED EMBODIMENT

Figure 1:
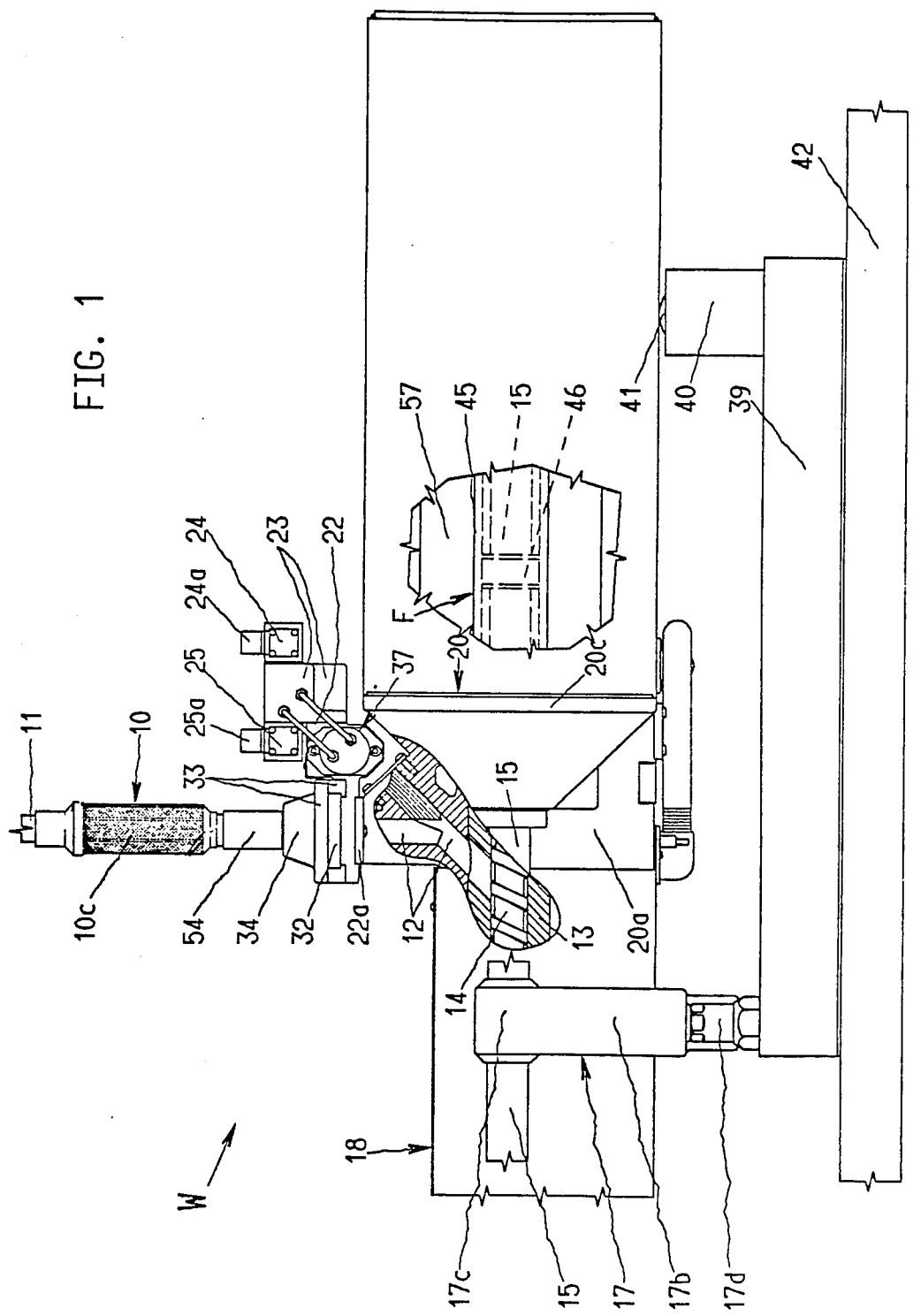
FIG. 1 is a schematic, partially sectional side elevational view of an injection molding unit according to a preferred embodiment of the invention.
Figure 2:
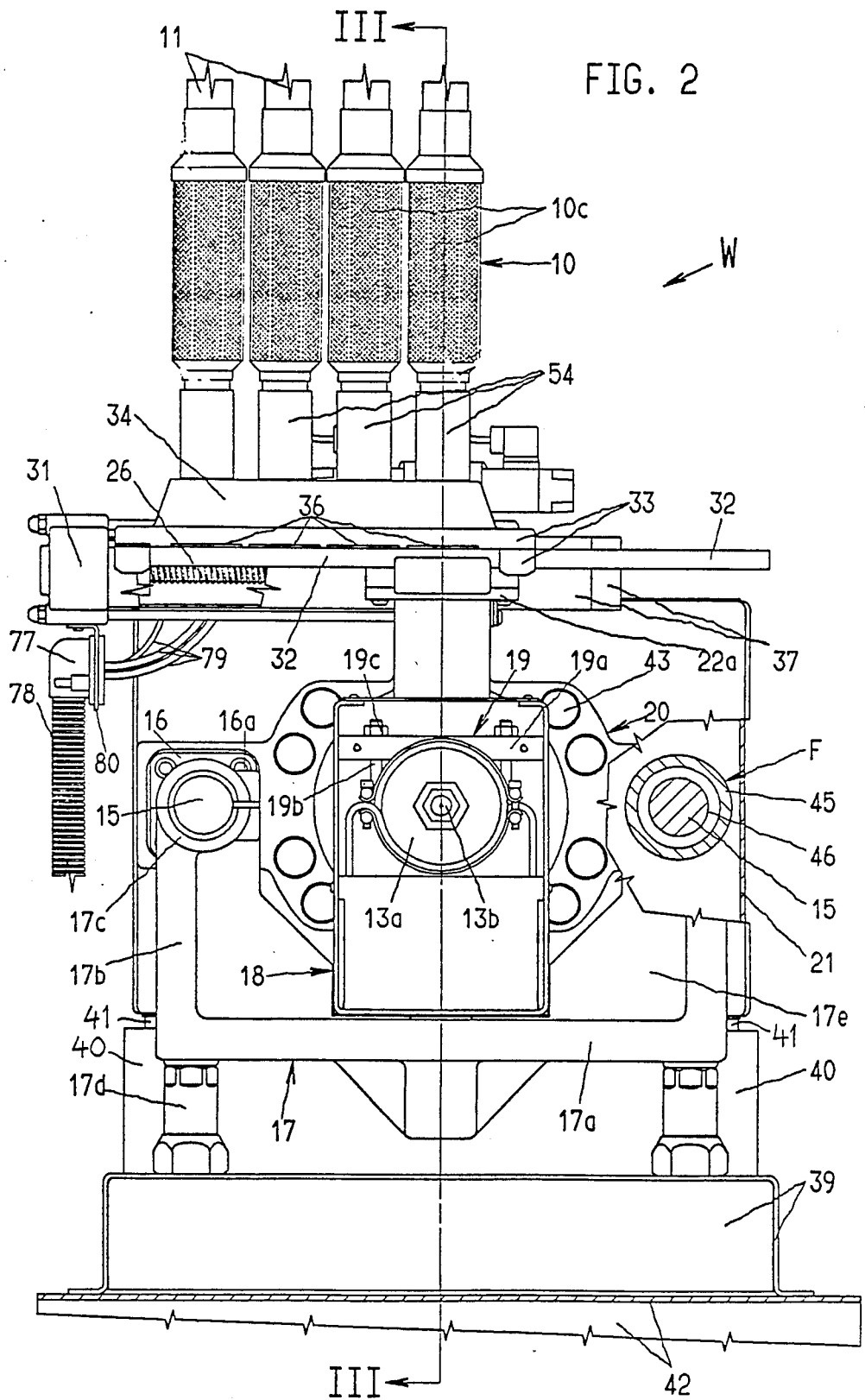
FIG. 2 is a front elevational view from the left side of the construction shown in FIG. 1, illustrated on an enlarged scale.

Turning now to FIGS. 1 and 2, there is shown an injection molding unit which forms part of an injection molding machine and which is axially displaceably supported on stationarily held horizontal rails 15. The rearward portion of the injection molding unit is supported on rollers 41 mounted in support posts 40 which, in turn, are placed on a support pedestal 39 of the machine stand 42. The horizontal columns 15 are at their frontal end anchored in a stationary mold carrier of the mold closing unit (neither shown) and are supported by a U-shaped yoke 17 mounted on the support pedestal 39.

By means of two hydraulic drive cylinders F, the injection molding unit may be inserted into and removed from an injection mold assembly held in the mold closing unit. The pistons 46 of the drive cylinders F are fixedly attached to the respective columns 15 and are thus stationary components.

A plasticizing cylinder 13 is received in a central passage of a supply block 20. The plastic material to be worked on by the injection molding machine is admitted to the plasticizing cylinder 13 from a reservoir situated externally of the injection molding unit, by means of an air stream through supply conduits 11 which may be coupled to a chute or hopper 12 formed in the supply block 20. The latter is traversed by the columns 15 and constitutes a carrier bridge. Also referring to FIG. 3, a rearward carrier component 70, similarly to the supply block 20, forms a carrier bridge so that the supply block 20, the carrier member 70 and a hydraulic cylinder assembly formed of an injection cylinder 57, 58 and the drive cylinders F constitute a structural unit, as described in German Offenlegungsschrift (non-examined published application) No. 3,447,597. The piston 58 of the injection cylinder unit 57, 58 and its piston rod 58a coaxially surround a spindle 64 which at its rear terminus torque-transmittingly surrounds a drive shaft 63b of a rotary drive 63 for a feed screw 14 coaxially received in the plasticizing cylinder 13. The rotary drive 63 is, by means of a securing flange 63a, attached to the hollow piston rods 58a with the intermediary of a coupling flange 71. The spindle 64 may, by virtue of its flange 64a and a thrust bearing 65, 66 rotate relative to the nonrotary piston 58 and is, during the axial injection stroke, axially displaced by the piston 58. On a terminal coupling portion 64b of the spindle 64 there is arranged a coupling part 35 which surrounds and is coupled to the rearward terminal portion of the feed screw 14.

The structural unit described above in connection with FIG. 3 is, as shown in FIG. 2, surrounded by a protective cover 21 of rectangular cross section whose lower horizontal wall forms, along bent edges, a track for the rollers 41 of the two support posts 40.

Figure 5:
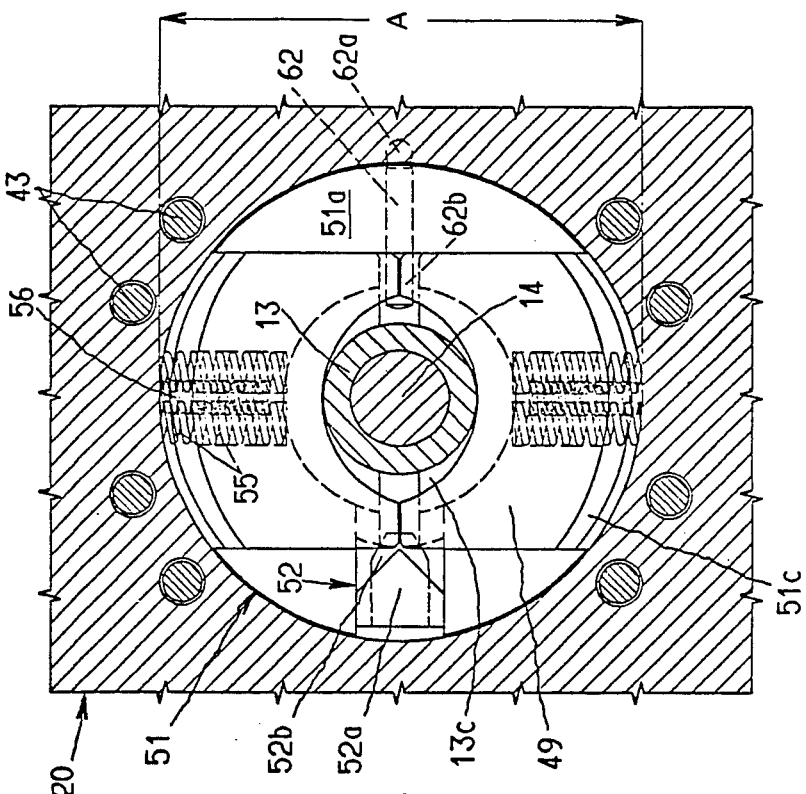
FIG. 5 is a sectional view taken along line V—V of FIG. 4.
Figure 4:
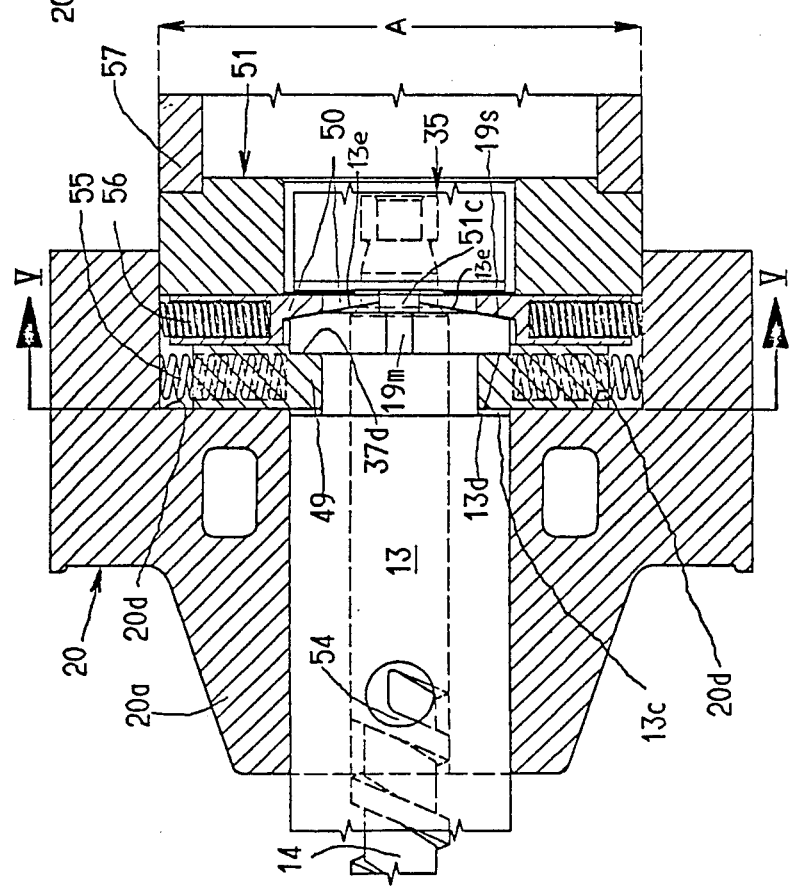
FIG. 4 is a sectional view taken along line IV—IV of FIG. 3.

Also referring now to FIGS. 6 and 7, the plasticizing cylinder 13 may be locked to the supply block 20 by means of locking bolts 49 and clamping bolts 50 which are radially guided in the supply block 20 and which are movable from a radially outer initial or inoperative position radially inwardly into a locking position. In the locking position, the locking bolts 49 project into a circumferential groove 13c of the plasticizing cylinder 13. With further reference to FIGS. 4 and 5, the central passage which traverses the supply block 20 and which receives the plasticizing cylinder 13 has an enlarged width A along a rearward portion. The plasticizing cylinder 13 axially projects into the enlarged rearward part of the central passage. The locking bolts 49 which may be driven radially inwardly to engage into the annular groove 13c, are guided on a radial annular shoulder 20d which is formed at the transition of the central passage of the supply block 20 to the portion of greater diameter.

Figure 3:
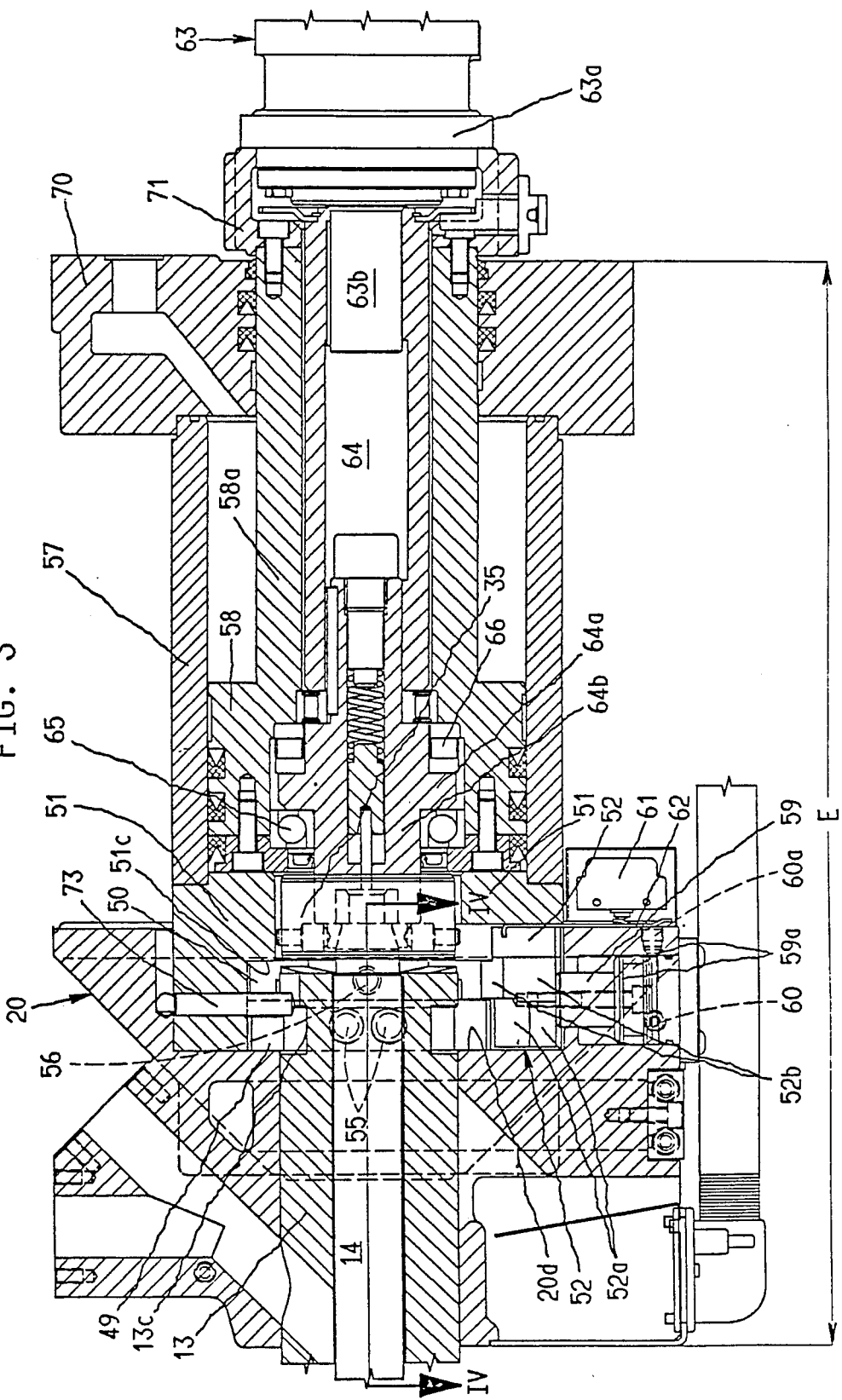
FIG. 3 is an axial sectional view taken along line III—III of FIG. 2, with some components omitted.
Figure 9:
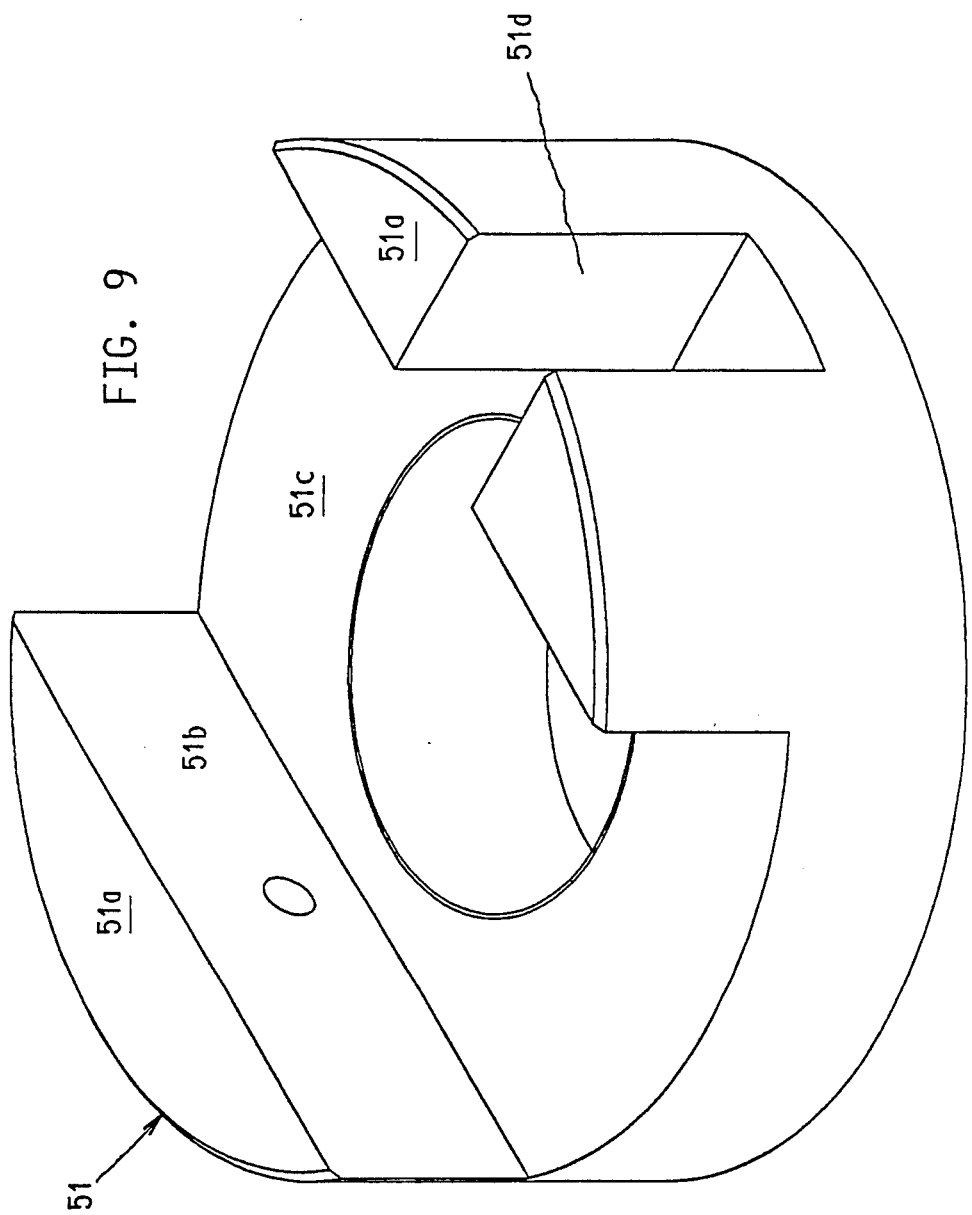
FIG. 9 is a perspective view of a support ring forming part of the preferred embodiment.

Also considering FIGS. 3 and 9, a support ring 51 projects into the central passage of the supply block 20 in a form-fitting manner. The support ring 51 is held axially by backup faces 51a on the radial shoulder 20d of the supply block 20. The support ring 51 has diametral guide recesses for the bolts 49, 50, bounded by guide faces 51b. The clamping bolts 50 which, when in their locking position, also exert an axial pressing force on the plasticizing cylinder 13 are guided at their oblique faces 50a between counterfaces 51c of the support ring 51 and the locking bolts 49.

Also referring to FIG. 4, during axial clamping, the oblique faces 50a of the clamping bolts 50 engage the rearward, oblique end faces 13e of the plasticizing cylinder 13. The latter is, when exposed to the axial bias, axially pressed with the rearward flank 13d of its groove 13c against the locking bolt 49.

Also considering now FIG. 8, the pairwise diametrally arranged locking bolts 49 and clamping bolts 50 are movable into their initial, inoperative position by means of radially guided wedges 52a, 52b of an unlocking member 52. For this purpose, the wedges 52a, 52b which can be driven between the respective diametral bolts 49 and 50, are arranged spatially in such manner in the unlocking member 52 that the wedge 52b associated with the clamping bolts 50, leads the wedge 52a cooperating with the locking bolts 49. By virtue of this arrangement, the clamping bolts 50 which axially bias the plasticizing cylinder 13 are removed from their locking and clamping position sooner than the locking bolts 49. The unlocking member 52 may be driven by means of a hydraulic cylinder 59 (FIG. 3) radially oriented in the supply block 20 and supplied with a hydraulic pressure medium admitted by hydraulic conduits 60, 60a. All bolts 49 and 50 are urged into their respective locking and clamping positions by means of radially oriented biased compression springs 55 and 56. As it may be observed in FIG. 9 in conjunction with FIG. 3, the unlocking member 52 is radially guided in a well 51d of the support ring 51.

Referring now particularly to FIGS. 1, 2, 10, 11 and 12, the supply block 20 is, at the chute 12, provided with a material changing device W with the aid of which a plurality of supply conduits 11 can be selectively connected with the chute 12. The material changing device W comprises a horizontal rail 32 which extends symmetrically on either side of the chute 12 and which is secured on a horizontal coupling surface of an upper extension 20b (FIG. 11) of the supply block 20. On the rail 32 there is mounted a carriage 33 which may be displaced on the rail 32 by a motor drive. The carriage 33 reaches behind the rail 32 with lugs 33a, 33b as particularly well seen in FIGS. 10 and 12. On the carriage 33 there is mounted a coupling component 34 for the supply conduits 11.

Figure 10:
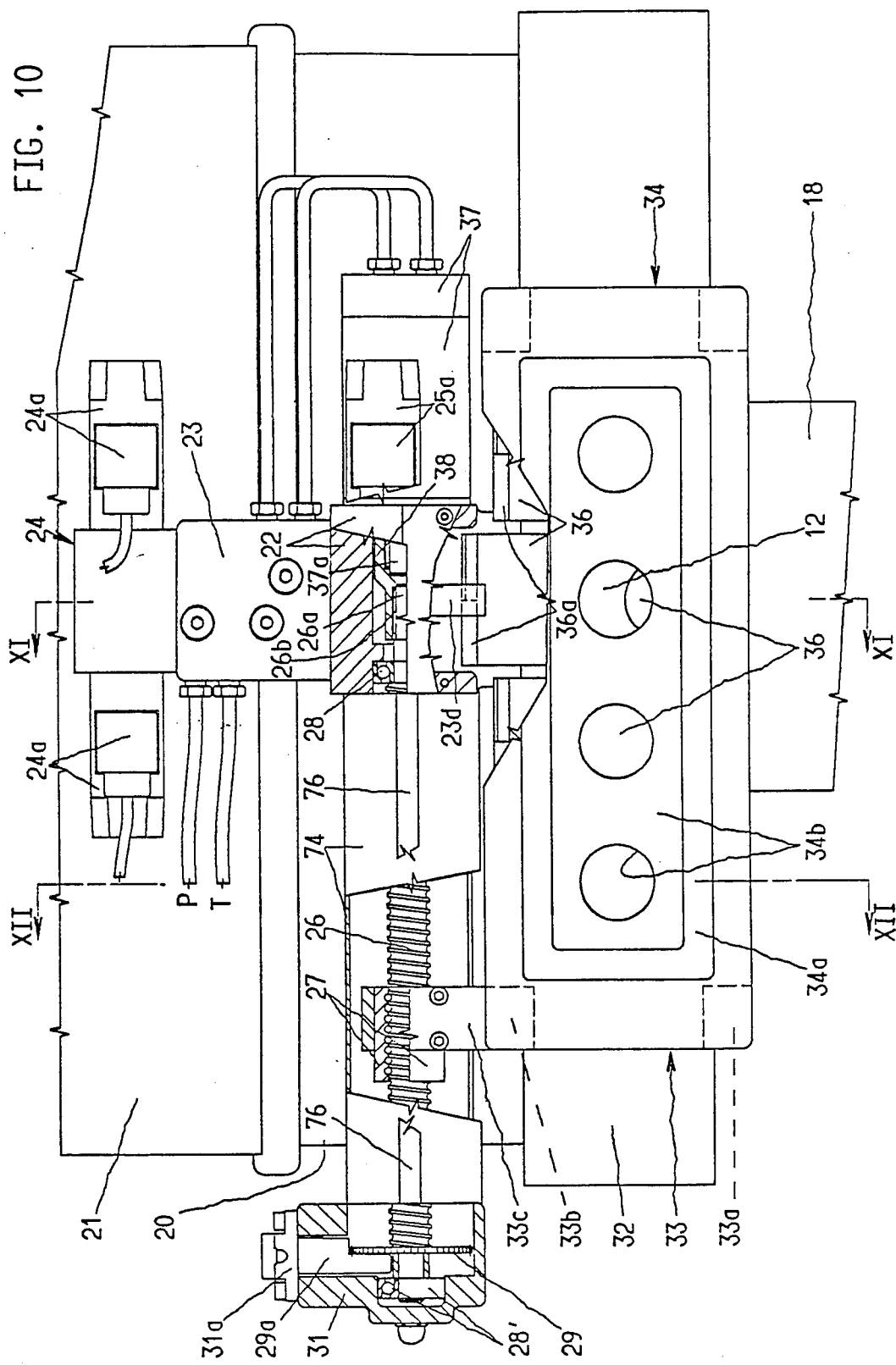
FIG. 10 is a top plan view, partially in section, of one part of the preferred embodiment.
Figure 11:
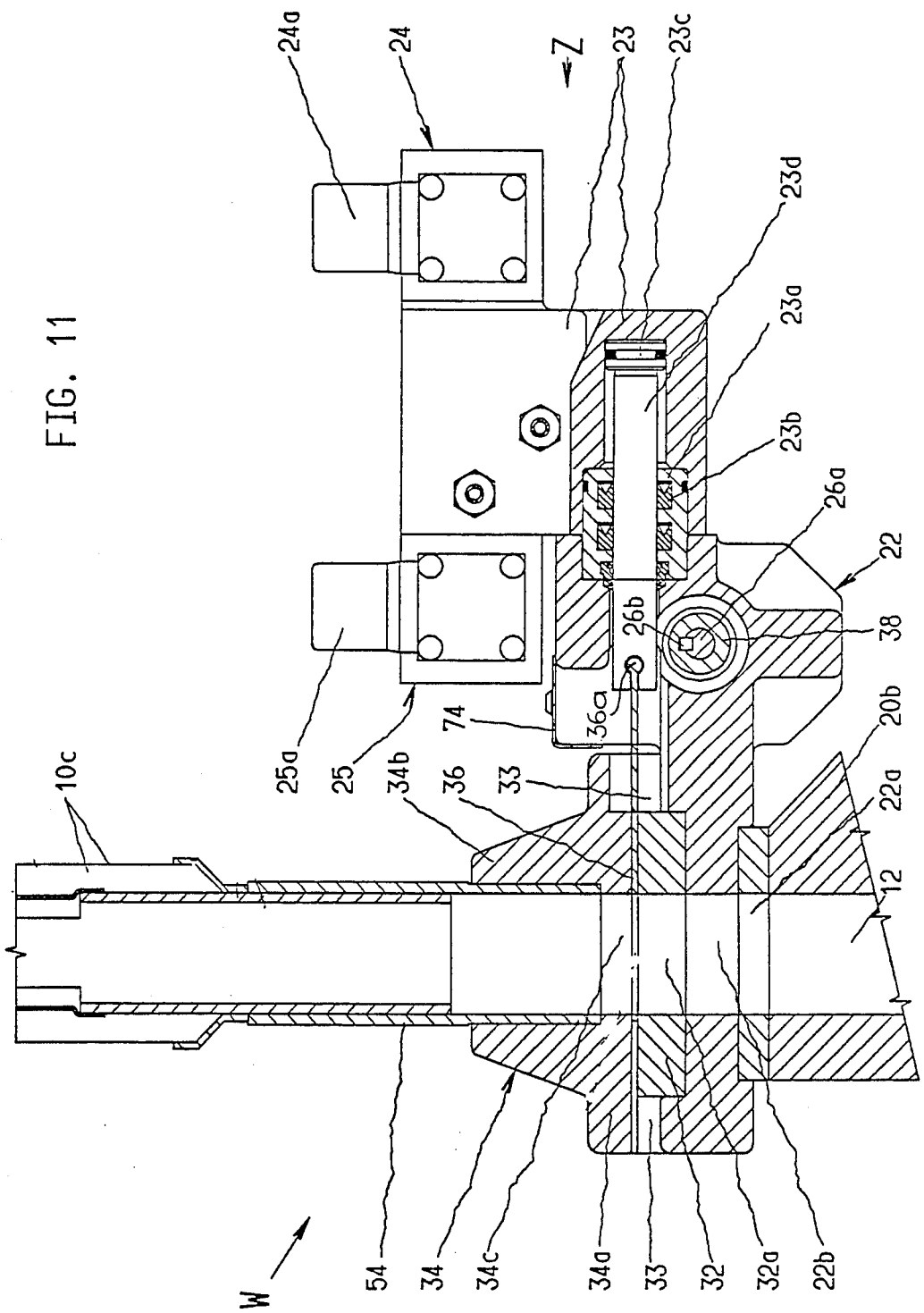
FIG. 11 is a sectional view taken along line XI—XI of FIG. 10.
Figure 12:
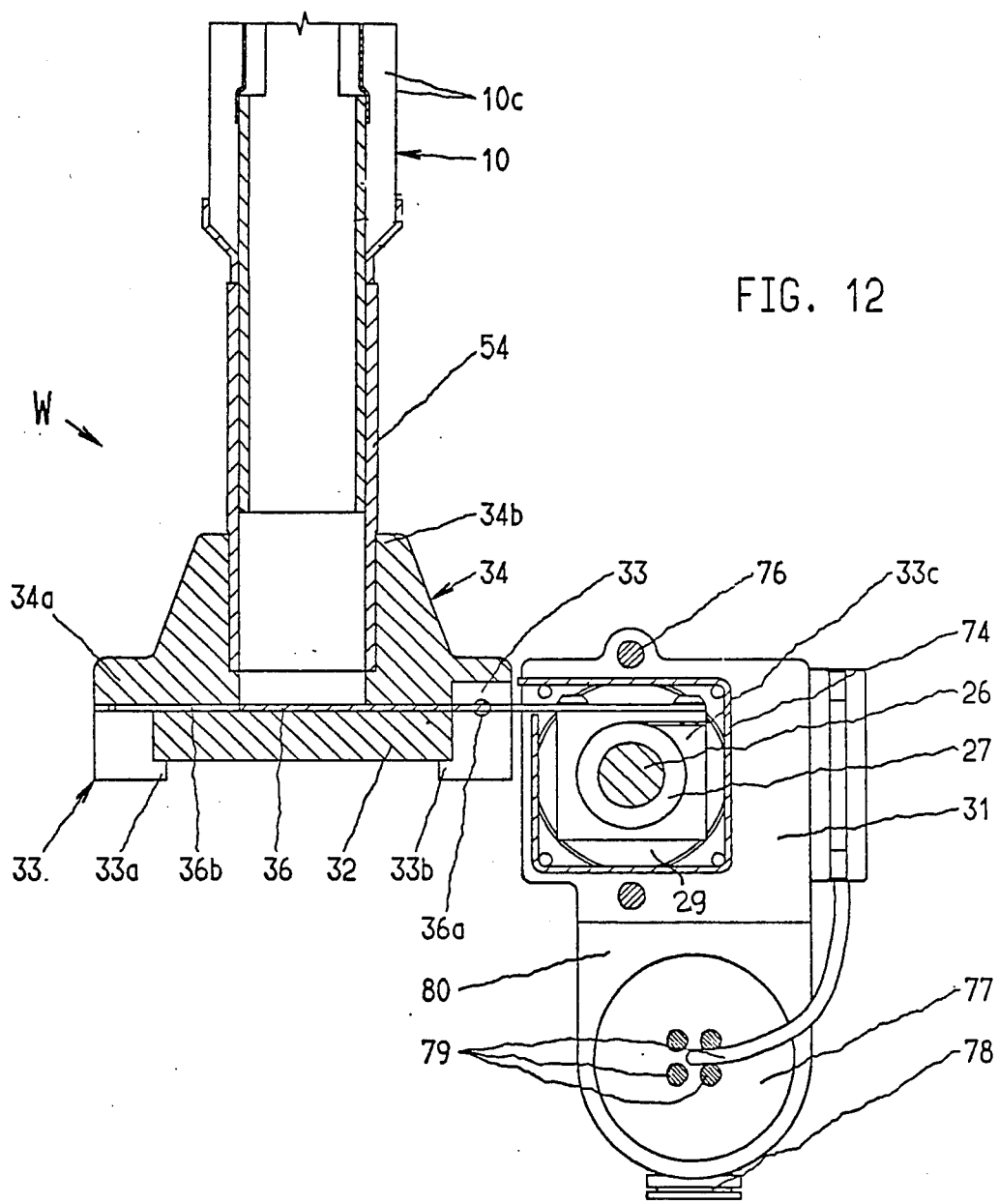
FIG. 12 is a sectional view taken along line XII—XII of FIG. 10.

With particular reference to FIG. 10, the motor drive for the carriage 33 comprises an axially supported threaded spindle 26 which is rotated by a hydraulic rotary drive 37. On the threaded spindle 26 there is mounted ball nut 27 which, by virtue of its balls, is in engagement with the threads of the spindle 26 and therefore, when the spindle 26 is rotated, the ball nut 27 is displaced in an axial direction. The ball nut 27 is mounted on a receiving flange 33c of the carriage 33 and therefore propels the latter during its axial displacements on the spindle 26. A support component 22 is centered on the supply block 20 by means of an anchor part 22a which is wedged between the rail 32 and the attachment 20b of the supply block 20. By virtue of this arrangement, the rail 32 and the projection 20b are surrounded in a form-fitting manner by a projection of the support 22 at the side facing the latter, as seen in FIG. 11. The threaded spindle 26 which is surrounded by a cross-sectionally rectangular protective cover 74 is received together with its coaxial rotary drive 37 in the support 22. To the support 22 there is also secured a distributor block 23 which distributes a pressure medium for the rotary drive 37 and a hydraulic cylinder serving to control the slides 36 of the material changing device W. The pressure medium is supplied from a pump in a pressure conduit P and is returned to a sump by a conduit T.

As seen in FIGS. 10 and 11, switching valves 24 and 25 provided with respective electric terminals 24a and 25a are arranged at opposite parallel sides of the distributor block 23. The switching valve 24 controls the hydraulic rotary drive 37 while the switching valve 25 controls the piston 23c of a shifting cylinder. A coupling pin 26a of the threaded spindle 26 is torque-transmittingly connected by means of a carrier 26b with a coupling part 38 which, in turn, is torque-transmittingly secured to a drive spindle 37a of the rotary drive 37, as shown in FIG. 10. The axial position of the coupling pin 26a is determined by means of a combined radial thrust bearing 28 in the support component 22. At its other end the threaded spindle 26 is rotatably supported in a housing 31 which is connected to the support component 22 by diametrically arranged bars 76. The protective cover 74 engages, with its respective opposite ends, the support component 22 and the housing 31. A transmitter disc 29 mounted on the threaded spindle 26 in the housing 31 forms, together with a sensor 29a, a pulse transmitter which delivers signals for the computer of the injection molding machine for the driving device of the carriage 33 as a function of the rotation of the threaded spindle 26. The upwardly open housing 31 is covered by a lid 31a which supports the sensor 29a.

The supply conduits 11 may be attached to coupling bores 34b of the coupling component 34 by means of sleeve jacks 54 and may be locked by locking elements. By displacing the carriage 33, the supply conduit 11 associated with the selected plastic material, may be brought—according to the program of the computer of the injection molding machine—into a position in which the drop hole 34c of the coupling member 34 associated with the selected supply conduit 11, the drop hole 36b of the associated slide gate 36 situated between the coupling member 34 and the rail 32, the drop hole 32a of the rail 32 and the drop hole 22b of the anchoring flange 22a are in alignment with the chute 12, as shown in FIG. 11.

With each drop hole 34c of the coupling member 34 there is associated a separate slide gate 36 which is displaceable transversely to the travelling direction of the carriage 33 into a position in which it closes off the drop hole 34c and thus blocks the supply of the plastic material. All the slide gates 36 of the material changing device W are controlled by a single hydraulic cylinder (shifting cylinder) comprising the piston 23c and the piston rod 23d, as shown in FIG. 11. The cylinder proper of the shifting cylinder is formed by a bore which is provided in the distributor block 23 and which is closed off by a cylinder lid 23a having sealing rings 23b. That slide gate 36 which controls the drop hole 34c momentarily in alignment with the chute 12 may be coupled by means of a coupling rib 36a with the piston rod 23d of the shifting cylinder. In the coupling position, the respective horizontal coupling rib 36a extends into a complemental recess provided in the piston rod 23d. Upon a horizontal displacement of the carriage 33 for the purpose of supplying another synthetic material, the coupling rib 36a automatically disengages from the piston rod 23d. In its place arrives the coupling rib 36a of the slide gate 36 which thus assumes its working position as the coupling rib 36a moves into the coupling recess of the piston rod 23d.

The supply conduits 11 may be charged from reservoirs which are situated externally of the injection molding unit, expediently at a location thereabove. An air stream which pneumatically conveys the plastic material and which is coupled to the chute 12 is controlled by a dosing device 10 which comprises a sieve head 10c of a construction described, for example, in German Patent No. 2,409,128, to which corresponds U.S. Pat. No. 3,980,208. The sieve head 10c regulates the air stream as a function of the extent of fill.

Reverting to FIGS. 3 and 8, the plasticizing cylinder 13 is secured against rotation by a pin 73 whose free end projects between the clamping bolts 50. An approximately quadratic unlocking part 52c of the unlocking member 52 controls the coupling device for the feed screw 14. Also referring to FIG. 5, the unlocking member 52 is operatively connected by means of an actuating element 62 with a control switch 61 which is secured to the supply block 20.

When the locking bolts 49 as well as the clamping bolts 50 are in their radially outer, withdrawn position, the supply block 20 is, by means of a corresponding reverse stroke (releasing stroke) axially moved away from the other components of the injection molding unit so that the plasticizing cylinder 13 is freed, making possible a removal of the plasticizing unit. During the releasing stroke, the plasticizing cylinder 13 surrounded by a cross-sectionally rectangular cover 18 (FIG. 1) may be axially immobilized by a hydraulic cylinder whose piston (neither shown) engages into the cover 18.

An exchange of the plasticizing unit with a simultaneous exchange of the plastic material is effected by a computer program by performing the steps now to be set forth.

The injection molding unit is pulled off the injection mold assembly by a corresponding reverse stroke of the drive cylinders F. Thereafter, the bolts 49 and 50 are pushed out by a radial stroke of the unlocking member 52 from their respective locking position and simultaneously the plasticizing unit is axially immobilized. Thereafter, the plasticizing unit is separated from the remaining components of the injection molding unit by a releasing stroke of the drive cylinders F which causes the plasticizing cylinder 13 to move away from the plasticizing unit. After the releasing stroke, the plasticizing unit is supported by the lower horizontal wall of the cover (casing) 18 on a horizontal web 17a of the support yoke 17 and is there centered by means of stiffening ribs 17e, as shown in FIG. 2. In this position, the plasticizing unit is ready for an upward removal. The selected new plasticizing unit is, in the same process steps performed in a reverse sequence, brought into the working position and locked to the supply block 20. Thereafter, with the aid of the plastic material changing device W, another selected supply conduit 11—through which the desired new material is to be fed—is brought into alignment with the chute 12 of the supply block 20 by means of a corresponding displacement of the carriage 33.

During the above-described exchange of the plasticizing cylinder with a simultaneous exchange of the plastic material, the readying of the new plastic material may be effected exclusively by a computer program without manual interference, particularly as concerns the removal of the supply components. This also applies in case new plastic materials are to be used without exchanging the plasticizing unit.

The support yoke 17 on which the plasticizing unit rests subsequent to the releasing stroke is mounted on the support pedestal 39 by means of posts 17d, as shown in FIG. 2. During the releasing stroke the other components of the injection molding unit which are separated from the plasticizing unit are slidably supported on the columns 15 by means of the frontal cylinder closures 16, the drive cylinders F and the reverse side cylinder closures.

During the inserting operation the entire injection molding unit is supported in the above-discussed manner by the cylinder closures of the drive cylinders F.

The present disclosure relates to subject matter contained in Federal Republic of Germany Patent Applications No. P 35 26 710.0 (filed July 26th, 1985) and P 36 05 219.1 (filed Feb. 19th, 1986) which are incorporated herein by reference.

It will be understood that the above description of the present invention is susceptible to various modifications, changes and adaptations, and the same are intended to be comprehended within the meaning and range of equivalents of the appended claims.

What is claimed is:

1. In an injection molding machine for plastic materials, having an injection molding unit including a plasticizing unit having a plasticizing cylinder and a feed screw rottably and axially shiftably received in said plasticizing cylinder; the injection molding unit further including a supply block having a central passage adapted to receive an end portion of said plasticizing cylinder and a chute having first and second opposite open ends; said first end of said chute communicating with said passage; the improvement comprising
   (a) a carriage arranged at said injection molding unit for displacement with respect to said chute along a travel path;
   (b) means defining a plurality of spaced drop holes on said carriage for travel therewith; said drop holes being arranged in a series extending generally parallel to said travel path and being adapted to be individually brought into alignment in a material charging position with said second end of said chute dependent on locations of said carriage on said travel path;
   (c) a plurality of conduits for admitting plastic material to said chute from a location externally of said injection molding unit; each conduit being coupled to a separate said drop hole;
   (d) a plurality of gates mounted on said carriage for travel therewith; each gate cooperating with a separate said drop hole and each gate having an open position in which plastic material may pass through the respective drop hole from the conduit connected thereto; each said gate having a closed position in which passage of the plastic material through the respective drop hole is blocked;
   (e) gate control means mounted stationarily with respect to said chute for moving a single selected gate, associated with the drop hole dwelling in the material charging position, into the open or closed position; and (f) coupling means for connecting said single selected gate to and disconnecting it from said gate control means.

2. An injection molding machine as defined in claim 1, further comprising motor means for propelling said carriage in said travel path and for stopping said carriage in a position in which a selected said drop hole is in operative alignment with said second end of said chute.

3. An injection molding machine as defined in claim 2, wherein said motor means for driving said carriage comprises a motor, an axially immovably supported threaded drive spindle connected to said motor for being rotated by said motor, a travelling nut threadedly received on said spindle and being secured to said carriage.

4. An injection molding machine as defined in claim 3, wherein said gate control means includes shifting cylinder means having a generally horizontal axis and said hopper having a generally vertical axis; said horizontal and vertical axes intersecting one another.

5. An injection molding machine as defined in claim 4, wherein said supply block has an upwardly oriented projection; further comprising a rail secured to said projection and supporting said carriage for travel thereon; a support component having an anchoring member; said support component being centered on said supply block by means of said anchoring member; said anchoring member being clamped between said rail and said projection; a thrust bearing supporting said spindle and being carried by said support component; a distributor block including said shifting cylinder means and being mounted on said support component; and further wherein said motor being supported on said support component.

6. An injection molding machine as defined in claim 1, further comprising means for supporting each said gate for sliding motion to assume said open or said closed position.

7. An injection molding machine as defined in claim 1, further comprising locking means for releasably locking said plasticizing unit to a remainder of said injection molding unit by means of said supply block; said locking means including bolts guided radially relative to said passage into and out of a locking engagement with said plasticizing unit; means for driving said bolts from a radially outward position into a radially inward position in which at least some of said bolts project into a recess of said plasticizing cylinder; said means for driving said bolts forming part of said locking means; and power means for withdrawing said plasticizing unit from said supply block.

8. An injection molding machine as defined in claim 7, wherein said passage of said supply block has a widened terminal portion; said widened terminal portion being arranged for coaxially receiving said end portion of said plasticizing cylinder; further comprising an annular shoulder within said passage; said annular shoulder constituting a radial annular base of said widened terminal portion; some of said bolts being radially guided on said annular base for cooperating with said recess of said plasticizing cylinder.

9. An injection molding machine as defined in claim 8, wherein said bolts guided on said annular base are locking bolts arranged diametrically relative to said passage; further wherein some of said bolts are clamping bolts arranged diametrically relative to said passage and having oblique faces arranged to exert an axial force on said plasticizing cylinder when said clamping bolts are in said radially inward position; further comprising a support ring coaxially and form-fittingly received in said widened terminal portion of said passage and abutting said radial annular base thereof; said support ring having guide tracks for radially guiding said locking bolts and said clamping bolts; said support ring further having an annular bottom face; said clamping bolts being situated axially between said locking bolts and said annular bottom face of said support ring.

10. An injection molding machine as defined in claim 9, wherein said recess of said plasticizing cylinder is a circumferential groove having axially spaced groove flanks; said plasticizing cylinder further having an end face adapted to be engaged by said oblique faces of said clamping bolts in the radially inward position thereof for axially pressing one of said groove flanks against said locking bolts projecting into said groove.

11. An injection molding machine as defined in claim 10, wherein said means for driving said bolts comprises spring means for urging said locking bolts and said clamping bolts radially inwardly into respective locking and clamping positions; further comprising unlocking means for moving said locking bolts and said clamping bolts into the radially outward, inoperative positions against forces exerted by said spring means; said unlocking means including a radially displaceable unlocking member drivable between said locking bolts and between said clamping bolts; said unlocking member having a first wedging face cooperating with said locking bolts and a second wedging face cooperating with said clamping bolts; said second wedging face leading said first wedging face as viewed during a radially inward motion of said unlocking member for moving said clamping bolts radially outwardly by said second wedging face prior to moving said locking bolts radially outwardly by said first wedging face during a radial inward motion of said unlocking member; said unlocking means further comprising a hydraulic power cylinder supported in said supply block and operatively connected with said unlocking member for driving said unlocking member radially inwardly.

12. An injection molding machine as defined in claim 1, wherein said coupling means has cooperating first and second parts; said first part comprising a plurality of first coupling components formed on each said gate and said second part comprising a second coupling component formed on said gate control means; said first coupling component of each gate entering into an operative coupling state with said second coupling component as a respective said drop hole enters into operative alignment with said second end of said chute upon displacement of said carriage; and said first component of each gate moving into an uncoupled state from said second coupling component as a respective said drop hole moves out of operative alignment with said second end of said chute upon displacement of said carriage.

13. An injection molding machine as defined in claim 12, wherein said gate control means includes shifting cylinder means having a generally horizontal axis and saisd hopper having a generally vertical axis; said shifting cylinder means carrying said second coupling component.

14. An injection molding machine as defined in claim 13, wherein each said first coupling component includes an enlargement and said second coupling component includes means defining a recess open in the direction of the travel path and being shaped to interlockingly accommodate said enlargement therein.

15. An injection molding machine as defined in claim 1, further comprising sleeve jacks for securing the discharging end portion of each said conduit in alignment with respective said drop holes, and dosing means operatively connected to each said conduit for controlling a material carrying air stream in each said conduit.

* * * * *